United States Patent [19]

Lofgren et al.

[11] Patent Number: 5,652,912
[45] Date of Patent: Jul. 29, 1997

[54] VERSATILE MEMORY CONTROLLER CHIP FOR CONCURRENT INPUT/OUTPUT OPERATIONS

[75] Inventors: John D. Lofgren, Orlando; Richard W. Benton, Altamonte Springs, both of Fla.

[73] Assignee: Martin Marietta Corporation, Bethesda, Md.

[21] Appl. No.: 618,986

[22] Filed: Nov. 28, 1990

[51] Int. Cl.[6] .................................................. G06F 13/00
[52] U.S. Cl. ........................... 395/841; 395/872; 395/858
[58] Field of Search .................................. 395/250, 425; 364/DIG. 1, 239, 239.51, 239.3, 521; 340/725, 740, 721; 365/189.05, 189.04, 230.03

[56] References Cited

U.S. PATENT DOCUMENTS

| | | | |
|---|---|---|---|
| 4,367,466 | 1/1983 | Takeda et al. | 345/121 |
| 4,399,435 | 8/1983 | Urabe | 345/25 |
| 4,442,503 | 4/1984 | Schütt et al. | 345/201 |
| 4,511,962 | 4/1985 | Machida et al. | 395/492 |
| 4,533,910 | 8/1985 | Sukonick et al. | 345/118 |
| 4,546,350 | 10/1985 | Tanaka | 345/28 |
| 4,573,116 | 2/1986 | Ong | 395/421.01 |
| 4,642,790 | 2/1987 | Minshull et al. | 395/158 |
| 4,649,377 | 3/1987 | Urabe | 345/118 |
| 4,651,146 | 3/1987 | Lucash et al. | 345/119 |
| 4,660,155 | 4/1987 | Thaden et al. | 345/10 |
| 4,663,735 | 5/1987 | Novak et al. | 345/190 |
| 4,694,288 | 9/1987 | Harada | 345/120 |
| 4,843,544 | 6/1989 | DuLac et al. | 395/250 |
| 4,885,699 | 12/1989 | Taoda et al. | 395/150 |
| 4,961,071 | 10/1990 | Krooss | 345/119 |
| 4,965,748 | 10/1990 | Chang et al. | 395/846 |
| 4,985,848 | 1/1991 | Pfeiffer et al. | 395/164 |
| 5,003,471 | 3/1991 | Gibson | 395/250 |
| 5,014,238 | 5/1991 | McLeish et al. | 395/775 |

*Primary Examiner*—Tod R. Swann
*Assistant Examiner*—J. Peikari
*Attorney, Agent, or Firm*—Burns, Doane, Swecker & Mathis, L.L.P.

[57] ABSTRACT

A memory controller includes an input data path and an output data path. First circuitry generates signals to put the input data into at least one variably-dimensioned logical array of memory cells of a memory. Second circuitry generates signals to extract from the memory the contents of at least one variably-dimensioned logical array of memory cells. The memory may be double buffered such that data input to one of the portions may take place simultaneously as data output from the other of the portions. In a preferred embodiment, any combination of up to 254 total variable-dimensioned logical arrays of memory cells may be defined for input to and output from the memory. The memory controller may be viewed as supporting two simultaneous processes, an input "windowing" process for receiving windows of data and an output "windowing" process for simultaneously passing out windows of data. The memory controller is preferably realized in the form of a monolithic integrated circuit employing "bit-slice" architecture and is static and dynamic RAM-compatible.

25 Claims, 10 Drawing Sheets

Chip 401 — MCC UXXX F

Top edge pins (left to right):
- G2 — D000
- H2 — D001
- D3 — D002
- E3 — D003
- F3 — D004
- G3 — D005
- H3 — D006
- E4 — D007
- F4 — D008
- G4 — D009
- K4 — D010
- L4 — D011
- M4 — D012
- J3 — D013
- K3 — D014
- L3 — D015
- M3 — D016
- N3 — D017
- J2 — D018
- K2 — D019
- Q3 — WSO
- Q4 — LSO
- Q5 — PIX00
- Q7 — PIX01
- P3 — PIX02
- P4 — PIX03
- P5 — PIX04
- P6 — PIX05
- P7 — PIX06
- N4 — PIX07
- N5 — PIX08
- N6 — PIX09

Left edge pins (top to bottom):
- B14 — SCIN
- G15 — SCEN
- E15 — RESB
- H13 — RCOS
- J13 — RCIS
- L12 — PRCOS
- M15 — MASTER
- F2 — COM9
- D2 — COM8
- C2 — COM7
- H1 — COM6
- G1 — COM5
- F1 — COM4
- E1 — COM3
- D1 — COM2
- C1 — COM1
- B1 — COM0
- N15 — ENBS
- Q10 — TSOE
- Q9 — DOE
- Q11 — OFRZ
- F12 — CKO
- J4 — CKI
- Q8 — FLDM
- Q2 — REFI
- M7 — SWFRM

Right edge pins (top to bottom):
- P13 — OFRI
- L15 — ACTIV
- C14 — SCOUT
- F15 — PTEST
- K12 — RCIM
- J12 — RCOM
- H12 — PRCOM
- K13 — CAD10
- L13 — CAD9
- M13 — CAD8
- H14 — CAD7
- J14 — CAD6
- K14 — CAD5
- L14 — CAD4
- M14 — CAD3
- H15 — CAD2
- J15 — CAD1
- K15 — CAD0
- M9 — SWRI
- M8 — DWRI
- N9 — CSB13
- M11 — CSB12
- N8 — CSB11
- M10 — CSB10
- N7 — RASI
- P12 — RAB18
- P11 — RAB17
- P10 — RAB16
- P9 — RAB15
- P8 — RAB14
- N13 — RAB13
- N12 — RAB12
- N11 — RAB11
- N10 — RAB10
- C7 — SWRO
- C6 — DWRO
- D7 — CSB03
- D4 — CSB02
- D6 — CSB01
- C8 — CSB00
- C5 — RAS0
- B2 — RAB08
- B3 — RAB07
- B4 — RAB06
- B5 — RAB05
- B6 — RAB04
- B7 — RAB03
- B8 — RAB02
- C3 — RAB01
- C4 — RAB00

Bottom edge pins (left to right):
- M6 — FLD
- Q1 — WSI
- M5 — LSI
- L2 — PIX10
- M2 — PIX11
- N2 — PIX12
- P2 — PIX13
- J1 — PIX14
- K1 — PIX15
- L1 — PIX16
- M1 — PIX17
- N1 — PIX18
- P1 — PIX19
- B13 — DIN00
- B12 — DIN01
- B11 — DIN02
- B10 — DIN03
- B9 — DIN04
- C12 — DIN05
- C11 — DIN06
- C10 — DIN07
- C9 — DIN08
- D8 — DIN09
- E12 — DIN10
- D12 — DIN11
- F13 — DIN12
- E13 — DIN13
- D13 — DIN14
- C13 — DIN15
- G13 — DIN16
- G14 — DIN17
- F14 — DIN18
- E14 — DIN19

VERSATILE MEMORY CONTROLLER CHIP FOR CONCURRENT INPUT/OUTPUT OPERATIONS

BACKGROUND OF THE INVENTION

The present invention relates to data manipulation and more particularly to a versatile memory controller chip that, in combination with a memory buffer, enables a variety of data transformations to be performed.

Numerous computer applications require the data output of a first device to be suitably transformed for input to a second device. In the past, specialized interfaces have been designed as needed to accomplish such transformation. Such design is often time-consuming and expensive and yields as its end product a piece of hardware of only limited usefulness outside of the immediate environment for which it was designed. Such a "hard-wired" approach therefore not only entails prohibitive overhead but is of only limited effectiveness. In view of these problems and limitations, a need exists for a general-purpose intelligent interface module adaptable to different environments and capable of performing a wide variety of data transformations.

SUMMARY OF THE INVENTION

According to the present invention, a memory controller includes an input data path and an output data path. First circuitry generates signals to put the input data into at least one variably-dimensioned logical array of memory cells of a memory. Second circuitry generates signals to extract from the memory the contents of at least one variably-dimensioned logical array of memory cells. The memory may be double buffered, i.e., segmented into two separate portions, such that the input of data to one of the portions may take place simultaneously with the output of data from the other of the portions. Furthermore, the input data rate and the output data rate may be different from one another, governed by independent clocks. In a preferred embodiment, any combination of up to 254 total variably-dimensioned logical arrays of memory cells may be defined for input to and output from the memory. The memory controller may be viewed as supporting two simultaneous processes, an input "windowing" process for receiving windows (blocks or frames) of data and an output "windowing" process for simultaneously passing out windows (blocks or frames) of data.

In order to render the memory controller compatible with a wide range of memories, control signals are generated for both static random access memory (SRAM) which maintains data written into the memory so long as power is supplied, and dynamic random access memory (DRAM), in which data is lost unless it is accessed ("refreshed") at regular intervals. The memory controller is preferably realized in the form of a monolithic integrated circuit employing "bit-slice" architecture whereby a plurality of chips may be connected together to function as a single memory controller having a capacity equal to the sum of the individual capacities of the respective chips.

The memory controller chip proves particularly useful in the area of image processing. Capability is therefore provided for receiving either interlaced image data, in which every other video line of the image is first presented in a first field followed in turn by the intervening lines presented in a second field, or non-interlaced image data. Data is output in non-interlaced, frame-type format only. For purposes of image processing, the memory controller chip may be viewed as a generic, stand-alone, frame-oriented interface node.

BRIEF DESCRIPTION OF THE DRAWINGS

FIGS. 5, including

FIG. 7, including

DETAILED DESCRIPTION OF THE PREFERRED EMBODIMENTS

Figure 1A:
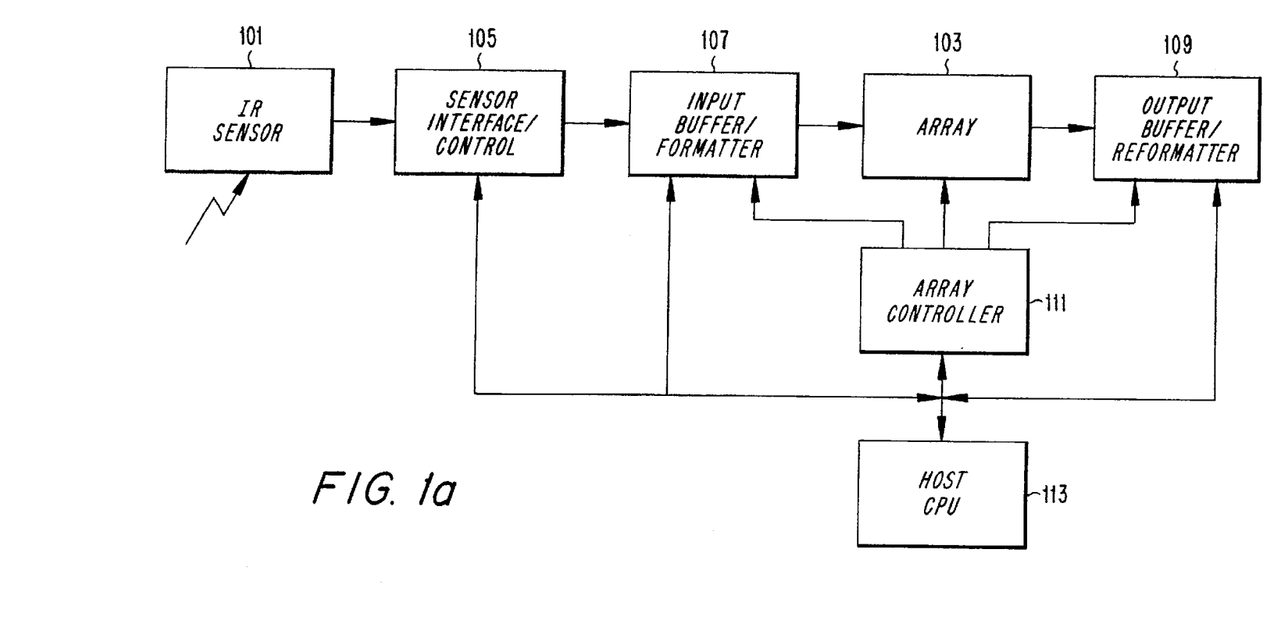
FIGS. 1a and 1b are block diagram illustrating one possible application of the memory controller chip of the present invention.

The memory controller chip of the present invention is a generalized, stand-alone intelligent interface applicable to a wide variety of interfacing problems encountered in different kinds of data processing systems. As a concrete example, however, one possible application of the memory controller chip is in an image processing system of a type illustrated in FIG. 1. An image sensor 101 (in this case an IR sensor) forms an image of a scene to be interpreted by an array processor 103, which may be analogized to the "brain" of the image processor. The array processor 103 is composed of an array of interconnected processing elements each responsible for processing a single picture element of the image or a part thereof. In order to organize the information from the image sensor into a recognizable video signal, a sensor interface/controller 105 is connected to the output of the image sensor. Additionally, in order to get the image data into and out of the array processor, an input buffer/formatter 107 is connected to the input of the array processor and an output buffer/reformatter 109 is connected to the output of the array processor. Immediate control of the array processor and its associated buffers is provided by an array controller 111 connected to the array processor 103 and each of the buffers (107,109). Overall control of the image processing system is provided by a host CPU 113 connected to the sensor interface/controller 105, the array controller 111, and the input and output buffers (107,109).

Figure 1B:
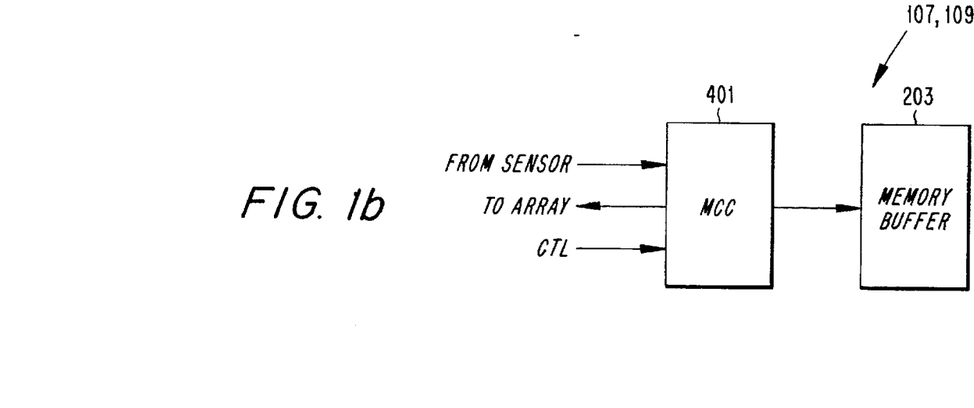

Ideally, the array processor 103 would be composed of a sufficient number of processing elements for a processing element to be assigned to each picture element of an entire scene. Because of continual improvement in image resolution, or the amount of detail of the image and information required to describe that amount of detail, and because of the expense and complexity involved in amassing a great number of processing elements into a single array processor, it is usually necessary to use an array processor having a smaller number of processing elements than the number of picture elements in a scene, with the image being processed as a series of sub-images. Furthermore, whereas the information rate of the image sensor 101 is usually relatively slow, the array processor 103 is designed for high speed operation in the range of 20 MHz or above. In the situation just described, the memory controller chip 401 of the present invention may be combined with a memory buffer 203 as illustrated in FIG. 1b to form the input buffer/formatter 107. Operation of the input buffer/formatter is depicted generally in FIG. 2. The combination of the memory controller chip and a memory buffer might likewise be used to form the output buffer/reformatter 109.

Referring now to FIG. 2, video frames 201 (or fields in the case of interlaced images) are input from the image sensor on a serial data path to a double buffered memory 203 via the memory controller chip (not illustrated). In a preferred embodiment, the double buffered memory is composed of two 1,024×1,024 memory arrays 205. Furthermore, in a typical application, the frame size of the video frames may be 512×512, such that by programming the memory controller chip to designate four separate input windows, one in each quadrant of the input memory array, four video frames may be contiguously packed into the input memory array. It should be understood, however, that the two memory arrays may be of any convenient size. It should also be understood that the video frames needn't be of equal dimensions, that those dimensions needn't evenly divide into the dimensions of the memory arrays, and that the video frames needn't be placed contiguously in the input memory array but may be placed arbitrarily within that array. Similarly, the number of video frames stored in the input memory array may be less than four or greater than four.

Figure 2A:
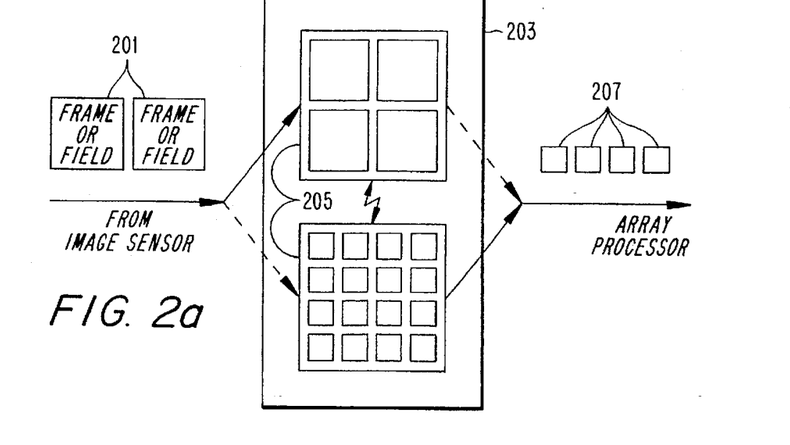
FIGS. 2A, 2B and 2C are a diagram representing operation of the memory controller chip.

For purposes of illustration it will further be assumed that the array processor is a 256×256 array such that each video frame must be divided into four video sub-frames in order to be processed by the array processor as illustrated in FIG. 2a. These sub-frames 207 are output to the array processor from the output memory array on a serial data path at the same time as the video frames are being input to the input memory array. Whereas in the present example, the total number of input and output windows is 20 (4+(4×4)), in the preferred embodiment the total number of input and output windows may be as many as 254.

When both the input windowing process and the output windowing process have run to completion, the roles of the input memory and the output memory array are reversed as indicated by the reversing double-headed arrow, and the connection of the input path and the output path becomes as indicated by the dashed arrows. The newly-filled input memory array thus becomes the current output memory array and the newly-emptied output memory array becomes the current input memory array.

Figure 2B:
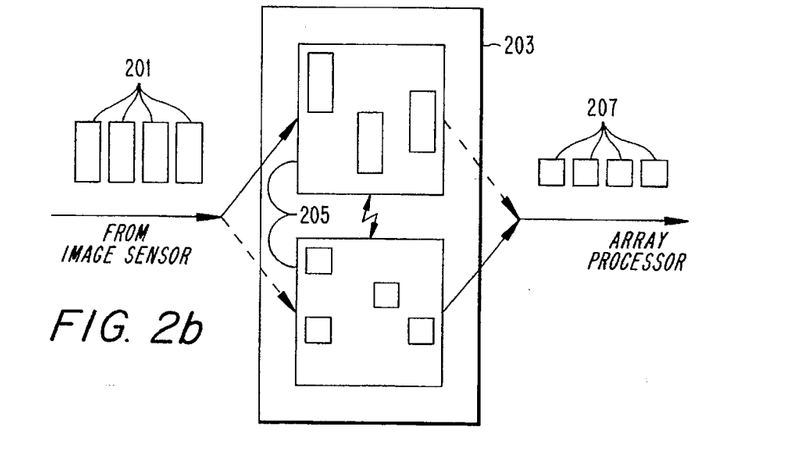
Figure 2C:
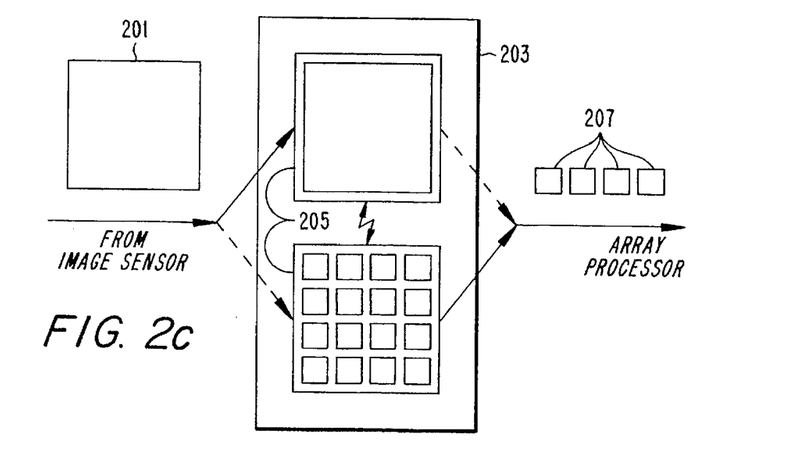

As illustrated in FIG. 2b, the input and output sub-arrays may be of different (arbitrary) sizes and may be placed in arbitrary locations in the input and output buffers. In the more usual case, however, a single large input frame will fill or nearly fill the input buffer and will be withdrawn from the output buffer in the form of regular sub-arrays as illustrated in FIG. 2c. Furthermore, although the sub-images have been illustrated as non-overlapping, in real-world applications some overlap between sub-images will be provided. For example, instead of 256×256 sub-images, the sub-images might instead be 320×320 with a 64-pixel overlap. Since the windows of the memory controller chip may be arbitrarily defined within the bounds of the memory buffers, overlapping windows are handled as easily as non-overlapping windows.

Figure 3:
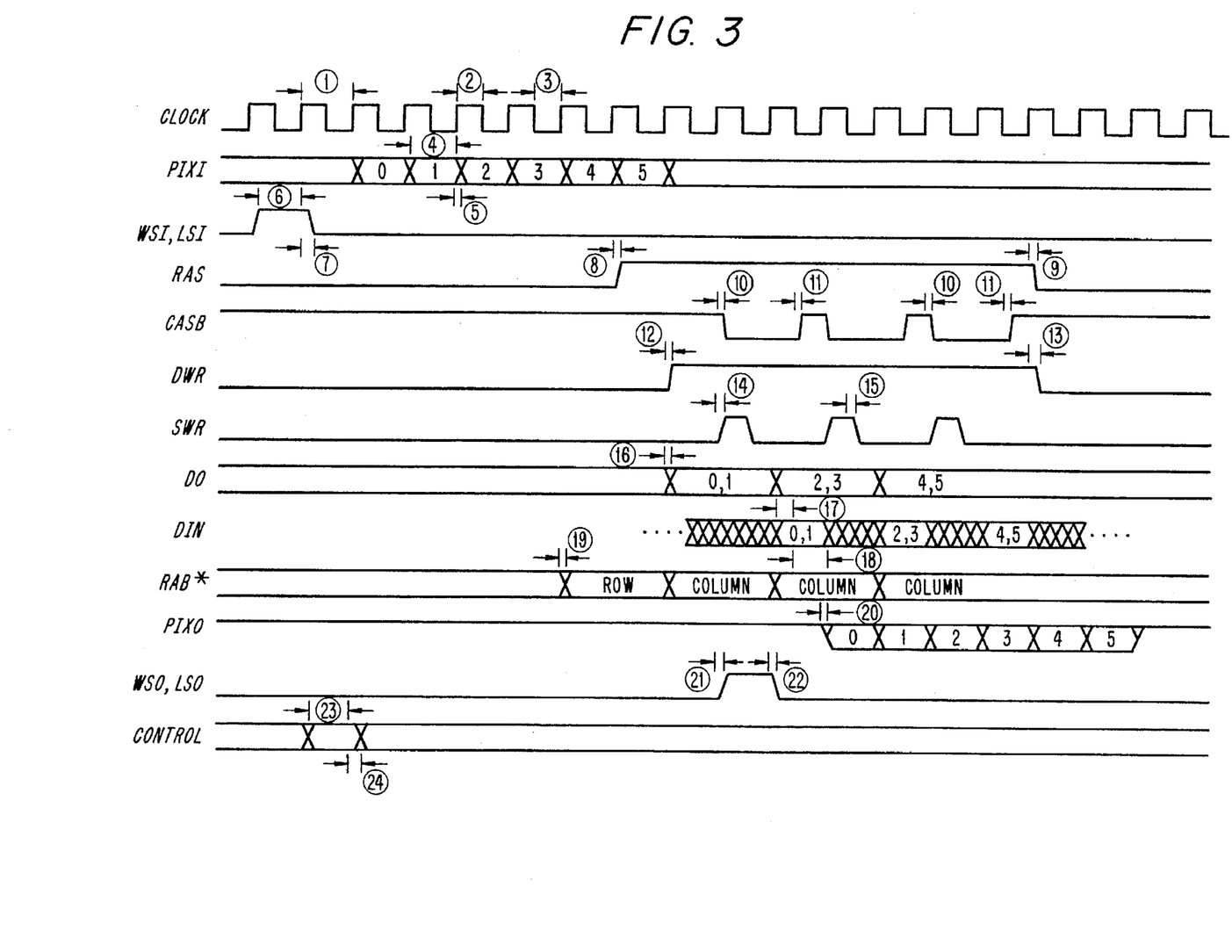
FIG. 3 is a timing diagram showing the relative timing of operations performed by the memory controller chip.

The operations of the memory controller chip may be better understood with reference to the timing diagram of FIG. 3. For purposes of illustration only, the input stream to and output stream from the memory controller chip is each assumed to be synchronized with a common clock signal CLOCK. In actual practice, however, the input stream and output streams are clocked independently by an input clock CKI and an output clock CKO, respectively, as will be more fully explained later.

Bearing in mind the conceptual overview of FIG. 2, the video frames arrive at the memory controller chip in the form of a stream of input pixels PIXI synchronized with the CLOCK signal. The beginning of a new video frame in the input stream is signaled by an input window synchronization signal WSI of one CLOCK duration and preceding the actual beginning of the input video frame by two CLOCKS. Individual video lines of the video frame are distinguished in identical fashion by a separate input line synchronization signal LSI. As the memory controller chip receives the input pixels, it drives those pixels off chip to the input array of the memory buffer two pixels at a time at half the data rate of the input stream. At the same time, the memory controller chip generates memory addresses RAB (RAM address inverted) for the input array of the memory buffer, first specified as a row address followed by individual column addresses within that row, etc. Addresses are generated so as to address the input memory sub-arrays programmed in the memory controller chip. According as to whether static RAM or dynamic RAM is used, multiple static RAM write signals SWR are generated or a single dynamic RAM write signal DWR is generated. In the latter instance, a row address strobe RAS and multiple inverted logic column address strobes CASB are generated in a manner well known in the art. The memory controller chip thereby writes the individual video frames into the individually specified input memory sub-arrays.

At the same time, and independently of the foregoing events, the memory controller chip reads out output sub-arrays from the output memory buffer two pixels at a time and then serializes those pixels to form an output stream having twice the frequency as the frequency at which the output memory buffer is read. The beginning of an output frame is preceded by an output window synchronization signal WSO and individual lines thereof are preceded by an output line synchronization signal LSO identically as with the input video frames described above. In addition to the basic signals just described, a number of additional control signals control operation of the memory controller chip and are grouped together under the common designation CONTROL. This is a generic signal shown only for its relationship to the CLOCK. A complete list of exemplary timing requirements appears as Table A and may be referred to at intervals as various ones of the signals are more completely described below.

Figure 4:
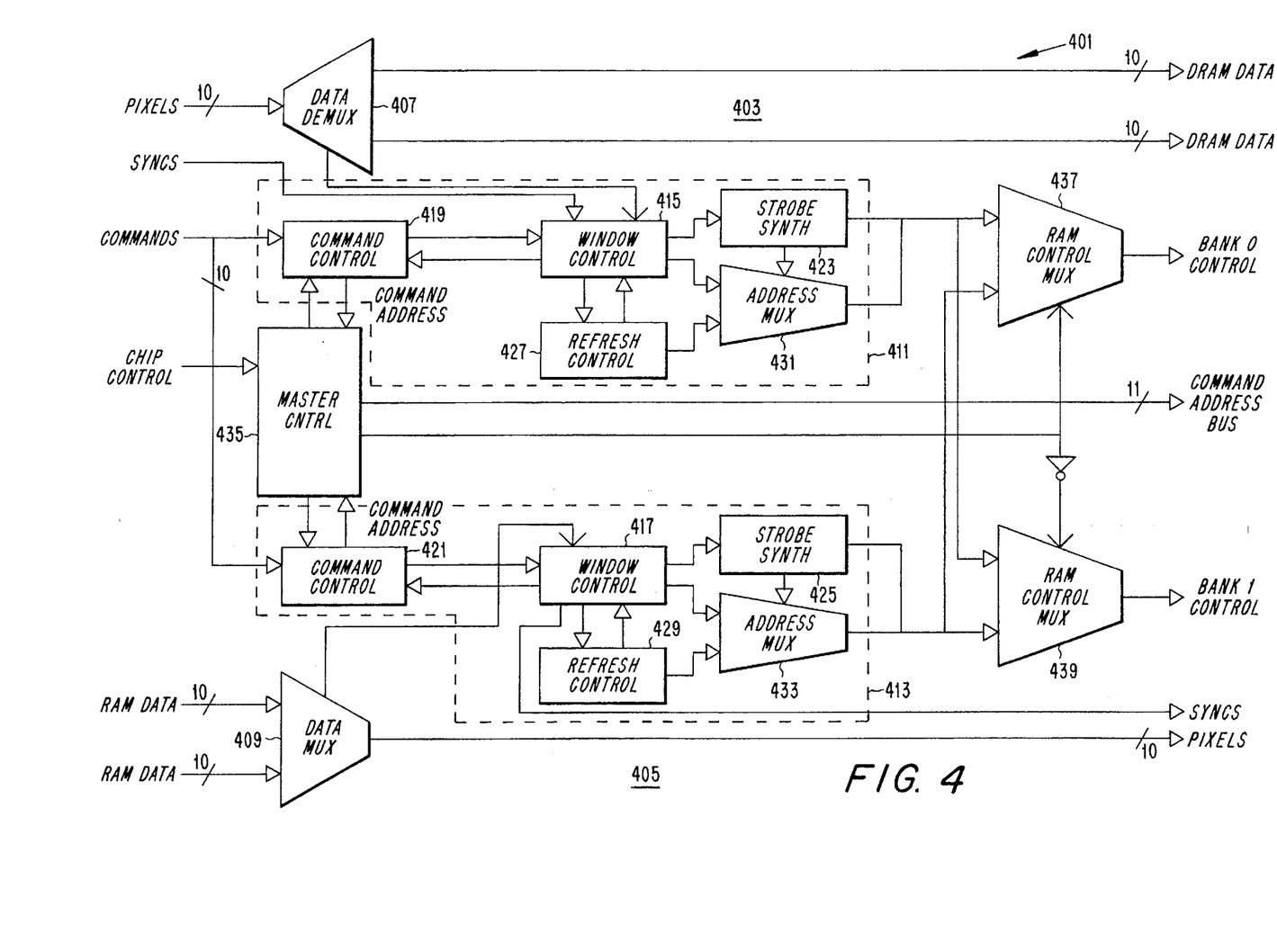
FIG. 4 is a block diagram of the memory controller chip.

Referring to FIG. 4, the essential symmetry of the input and output windowing processes lends an equal degree of symmetry to the block diagram of the memory controller chip 401. The input and output data paths (403,405) perform inverse operations of one another, the input data path receiving 10-bit pixels at a data demultiplexer 407 and outputting two 10-bit pixels at a time at half the frequency for storage in the input memory buffer. The output data path receives two 10-bit pixels at a time from the output memory buffer at a data multiplexer 409 and outputs the two pixels in succession at twice the frequency on a single 10-bit output pixel bus. In this manner, the speed requirements of the memory buffer may be reduced. The input and output windowing processes are controlled by nearly identical input and output windowing controllers (411,413), comprised of a window control block (415,417), a command control block (419, 421), a strobe synthesis block (423,425), a refresh control block (427,429) and an address multiplexer (431,433), the activities of the input and output windowing controllers (411,413) being coordinated by a master controller 435. Switching of the input and output memory arrays to reverse their respective roles is accomplished by a pair of RAM control multiplexers (437,439) each connected to the outputs of both of the input and output windowing controllers (411,413).

In addition to the double-buffered memory array, also provided off-chip of the memory controller chip is a double-buffered command store for specifying input and output sub-arrays of the input and output memory buffers. Although a single command buffer stores all the required commands to control both the input and output windowing processes, by double-buffering the command store, one of the command buffers remains available to receive new commands from a host processor.

In a preferred embodiment, the command buffers are 1024×10 in size. Input window commands are stored in ascending order in the lower address space of the command buffer, whereas output window commands are stored in descending order in the upper address space of the command buffer. In other words, the input window commands are stored beginning at the lower end of the command buffer and working towards the center while the output window commands are stored at the upper end of the command buffer working towards the center. Each of the input and output window commands is four words long, a first pair of words designating an initial X,Y pair in the appropriate memory buffer and a second pair of words designating a final X,Y pair in the appropriate memory buffer. Both the input and output window commands are preceded by a four word command segment used to control other aspects of the memory controller chip's operation as will be more fully explained later. Therefore, 1024–8=1016 words are available for input and output window commands, allowing for 1016/4=254 total input and output windows.

The master controller 435 addresses the command store using an 11-bit command address bus with one of the bits being used to select between the two command buffers. Two counters, one internal to each of the command controllers, sequence through the command buffer addresses, the input counter beginning at zero and counting up until a blank (0) command indicates the end of an input windowing command list and the output counter beginning at 1023 and counting down until a blank command indicates the end of an output windowing list. Commands are read out of the command buffer and are input on a common 10-bit command bus to the command controllers (419,421) of both the input windowing controller 411 and the output windowing controller 413, the master controller 435 strobing the appropriate command controller to register the command.

Focusing on the input windowing process, the command control block 411 communicates the command to the window control block 415. The window control block sequences through the addresses of the input sub-array in response to the input synchs WSI and LSI and a timing signal from the data demultiplexer 407. Essentially, a pixel counter inside the window control block 415 counts up from the initial X value of the input window command to the final X value for each value of a line counter, which counts from the initial Y value up to the final Y value. The X and Y counts are output on a bus to the address multiplexer 431. Each increment in the X and Y counts is signalled on lines to the strobe synthesis block 423 where a write signal of appropriate duration for the type of RAM employed is generated, along with RAS and CAS signals in the case of dynamic RAM. When both the X and Y counters of the window control block 415 reach their terminal values simultaneously, completion of the input window command is signalled back to the command control block 419 on a line. Meanwhile, assuming that the input command list and the command buffer have not been exhausted, the command control block 419 will have received a subsequent four-word input window command across the command bus and will be prepared to pass the new input window command on to the window control block 415. This process continues until the input window command list has been exhausted as indicated by a blank command.

The output windowing process proceeds simultaneously with and in similar fashion as the input windowing process. Demands for new window commands are relayed from the respective window control blocks (415,417) to the respective command control blocks (419,421) and relayed in turn from the respective command control blocks to the master controller 435 which acts in effect as a bus arbiter for the command bus, synchronizing the activities of the input windowing controller 411 and the output windowing controller 413. Communications between the window control blocks (415,417), the command control blocks (419,421), and the master controller 435 are all hand-shaked.

Preceding each of the input command list and the output list at the very bottom and the very top of the command buffer, respectively, is a pair of housekeeping commands. One of the commands specifies the video format of the output sub-arrays. As previously indicated, the output sub-arrays are preferably always output in a non-interlaced manner. The horizontal and vertical blanking times, however, of the output sub-arrays (in other words, the interval between output lines and individual output sub-arrays, or frames) may be programmed according to the foregoing command. Since the video format of the input data stream is, of course, determined solely by the video source, this command may be left blank in the input portion of the command buffer preceding the input command list.

If the memory controller chip 401 is used to control an SRAM memory buffer, the refresh control blocks (427,429) with their associated address multiplexers (431,433) shown in FIG. 4 are all inactive. More typically, however, when DRAM is used as the memory buffer, the refresh control blocks (427,429) will control refresh of the input and output arrays of the memory buffer as programmed by the user in the second of the two housekeeping commands. The 10-bit refresh command is divided into two 4-bit portions and two 1-bit portions. A first 4-bit portion specifies the number of rows of memory to be refreshed at the conclusion of each video line for so long as windows are being processed. A second 4-bit portion specifies an interval at which refreshes are to be performed after all of the window commands have been processed. The interval is specified as an integral number of 512-clock-long periods. One of the remaining bits combines with the 4-bit portion specifying the number of rows to be refreshed at the conclusion of each video line so as to further specify the number of rows to be refreshed at a time after all of the windows have been processed. The last remaining bit specifies the timing of the memory row address strobe RASB during refresh in terms of input or output clock cycles. For fast clock rates resulting in short duration clock cycles, three clock cycles are counted between RASB being asserted for a duration of five clock cycles. For low clock rates resulting in relatively long duration clock cycles, the duty cycle of RASB is made 1:1 instead of 5:3 for fast clock rates. One of the foregoing options should satisfy the requirements of current DRAMS with respect to RASB active and precharge times.

Figure 5A:
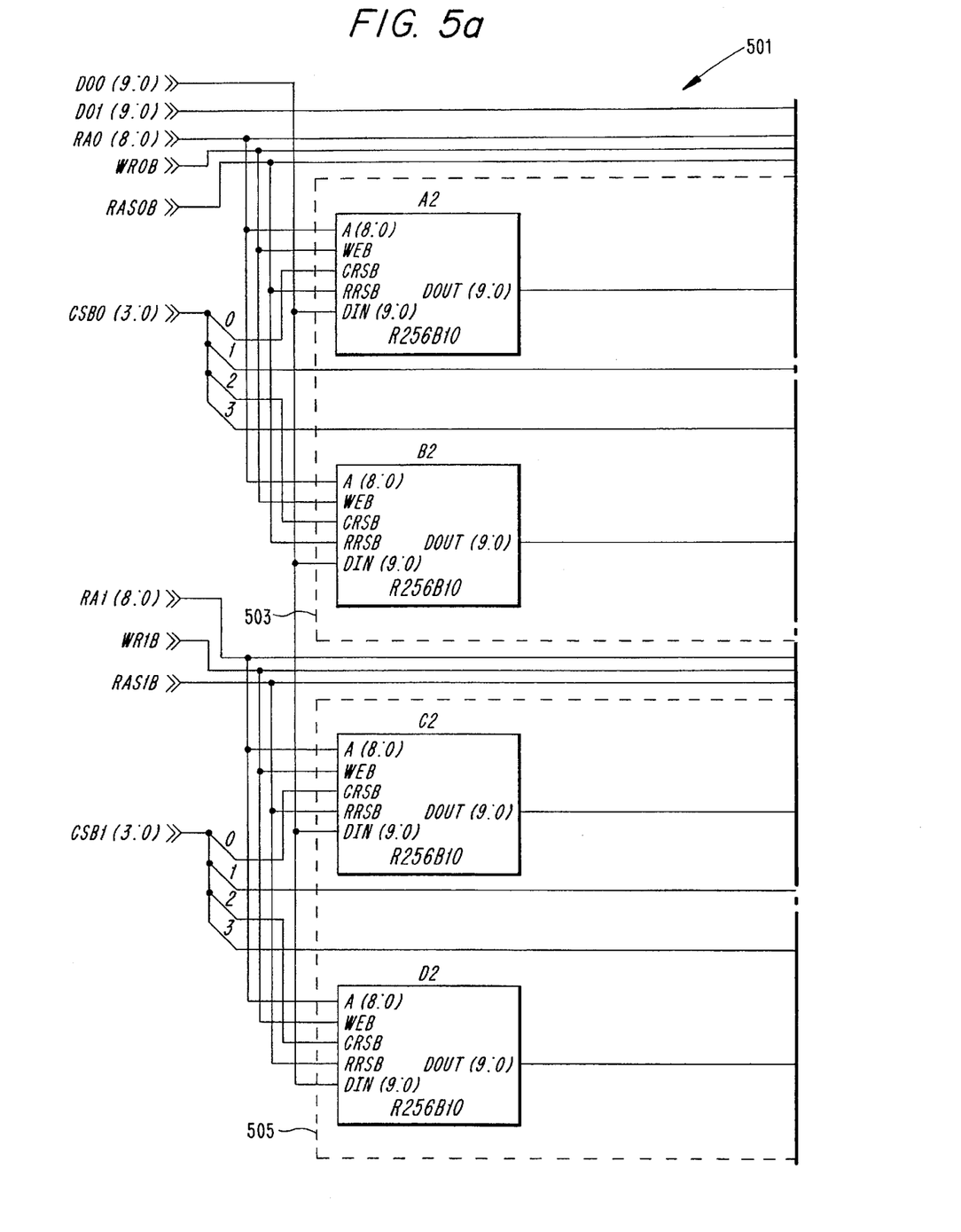
FIGS. 5a and 5b, is a block diagram of a memory to be controlled by the memory controller chip.
Figure 5B:
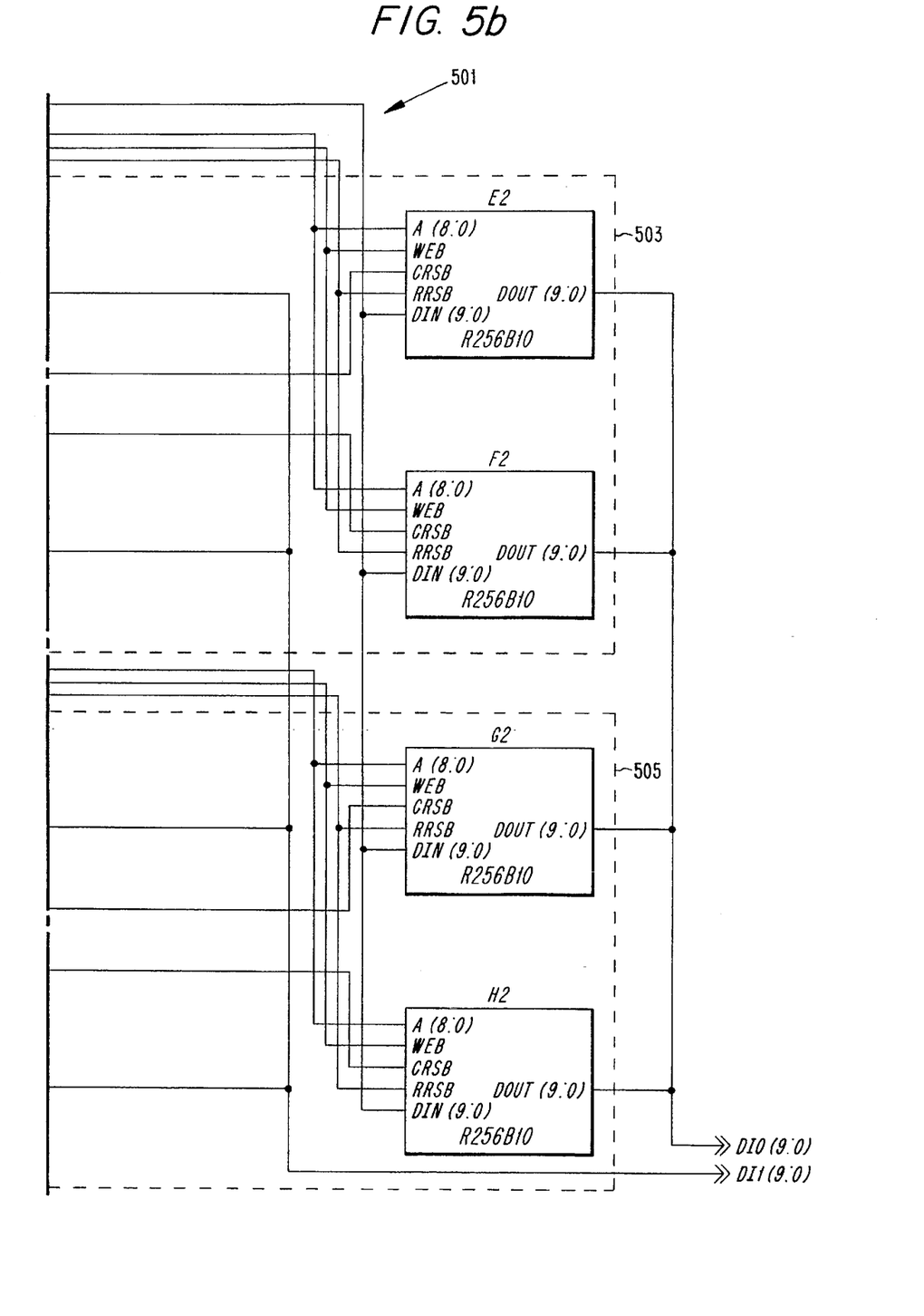

Referring to FIG. 5, the configuration of the memory buffer 501 is shown assuming the use of DRAM as will typically be the case. Only a single bit-plane of the memory buffer is shown corresponding to a single bit of the 10-bit pixels. To complete the memory buffer array, the illustrated bit-plane may be imagined as being stacked 10 deep.

Two 1024×1024 memory arrays (503,505) are provided using a total of eight 256K DRAMS, the upper four DRAMS belonging to a first memory array and the lower four DRAMS belonging to a second memory array. Even numbered pixels may be imagined as being stored in the left half of each array and odd numbered pixels stored in the right half of each array. Since pixels are input and output two at a time, the memory modules will generally operate in pairs, each module being paired with a horizontally opposing module. Of course, if an input or output sub-array is an odd number of pixels wide, only one of the paired modules will be active during transfer of the last pixel. For this reason separate column address strobe signals CSB are provided for each of the memory modules within each memory array (503,505). First data input and output buses (DO0,DI0) run to and from the even side of both memory arrays and second data input and output (DO1,DI1) buses run to and from the odd side of both memory arrays. Besides the foregoing signals, a bit address signal RA, a single write signal WR and a single row address strobe signal RAS are provided in common to each of the memory modules within both of the memory arrays.

Figures 6A, 6B, 6D:
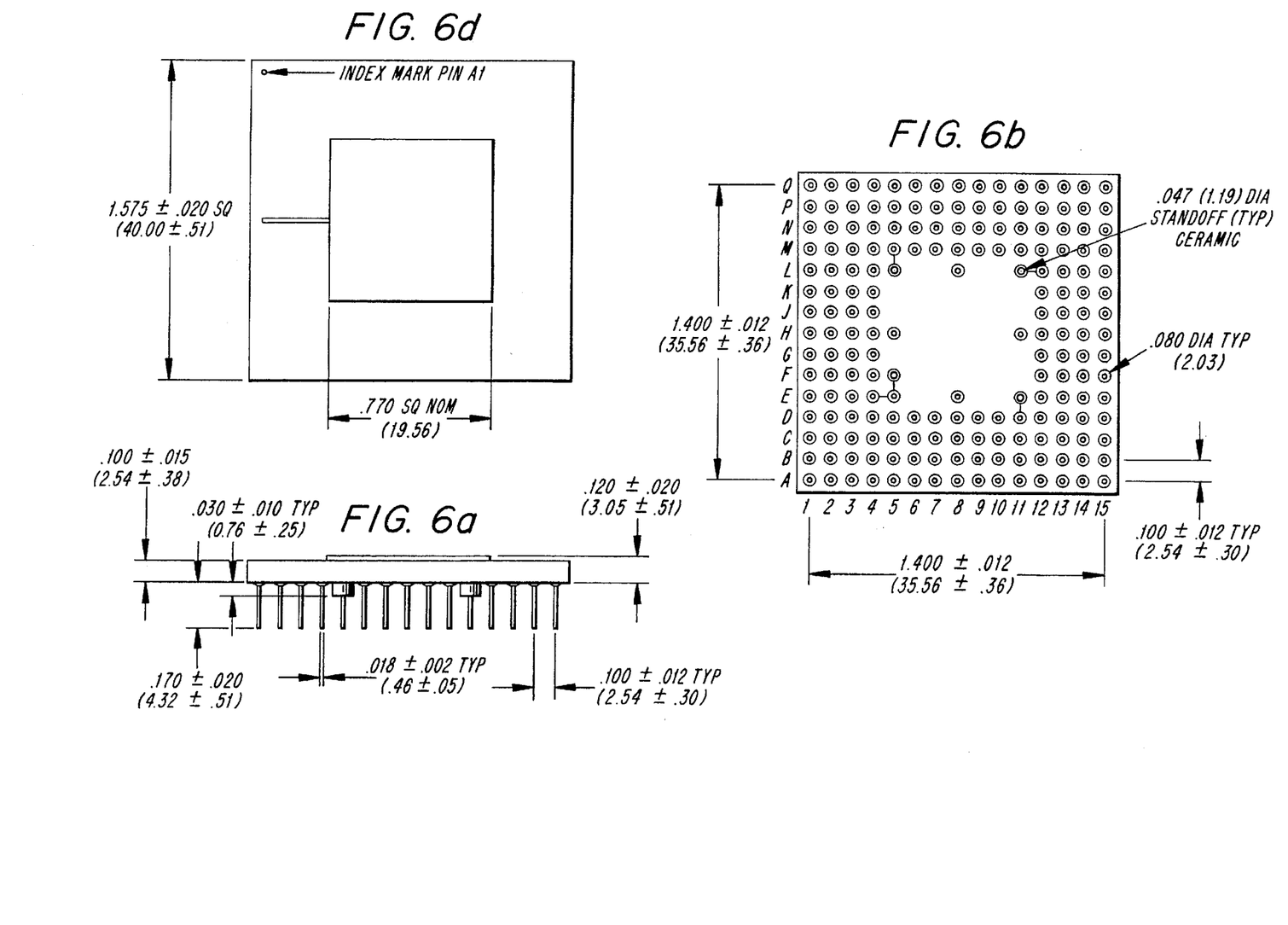
FIGS. 6a–6d are a diagram of the memory controller chip package and symbol.
Figure 6C:
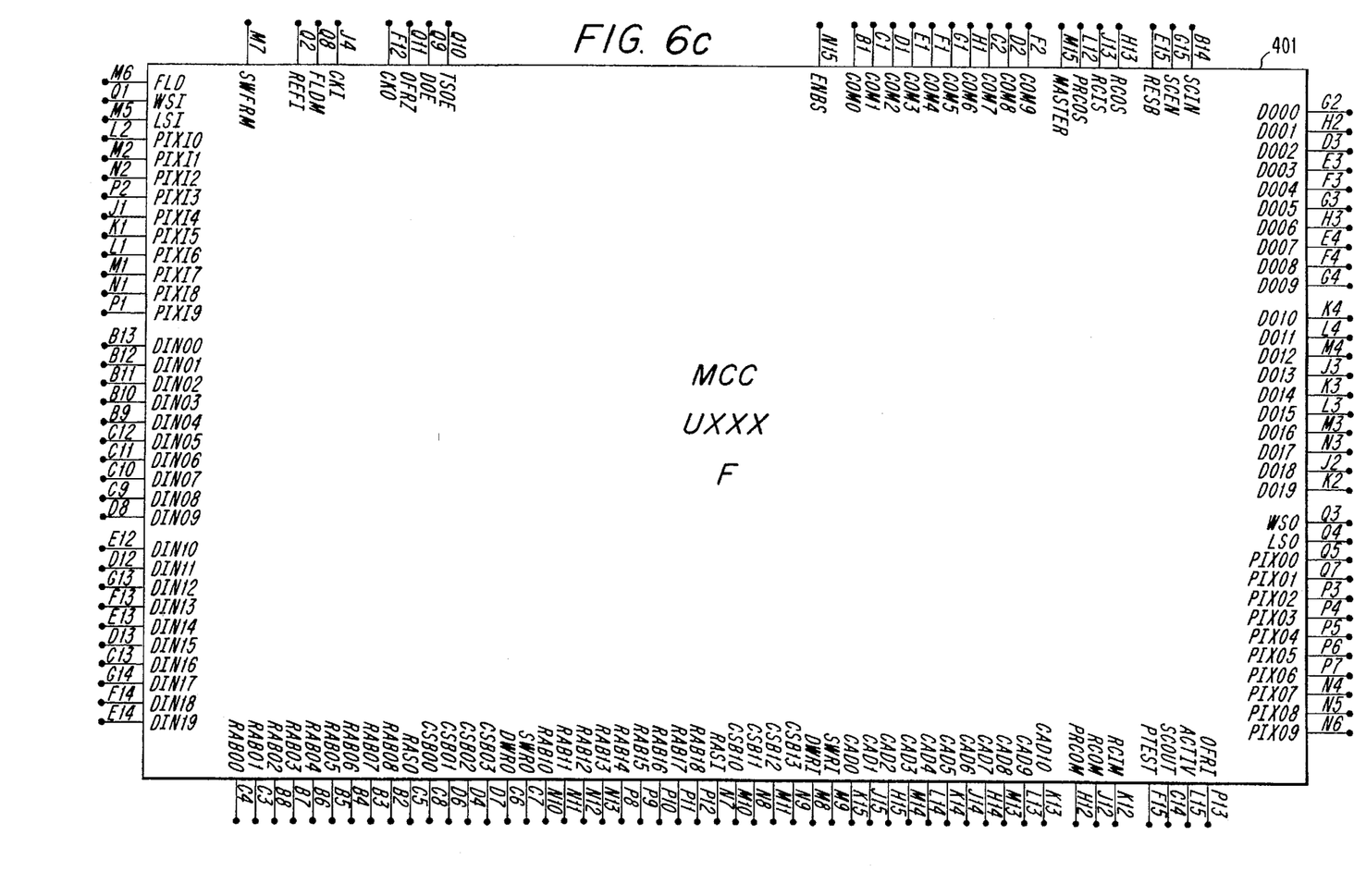

Referring to FIG. 6, the memory controller chip 401 of the present invention is preferably designed as a custom gate array and may be housed in a 180-pin ceramic pin-grid array having typical dimensions as shown in FIGS. 6a and 6b. Of the 180 available pins, 154 are used in a preferred embodiment of the present invention as shown in FIG. 6c, the memory controller chip 401 being represented for convenience as a rectangle having pin outs along the four sides thereof. In addition to the identified pins, an additional 14 pins are used to supply power and ground. A list of all the pins and their functions is set forth in Table B.

Referring still to FIG. 6c, the pins are grouped functionally with data input pins appearing along the left side of the chip symbol, data output pins appearing along the right side, memory interface pins appearing along the bottom, and control pins appearing generally along the top. The function of the various pins will be described briefly in that order.

The pins FLD, WSI and LSI identify the input field and control the synchronization of input sub-arrays to the memory controller chip. The level of the FLD pin identifies the field number, odd or even, of the current input field. A pulse on the WSI pin gives the memory controller chip two input clock cycles advance notice of an incoming sub-array. A pulse on the LSI pin gives the memory controller chip two input clock cycles advance notice of a new line of the input sub-array. Ten-bit video pixels are input one at a time on pins PIXI0–9 and output to the memory array two at a time on pins DO00–09 and DO10–19 on the opposite side of the chip. The reverse operation is performed in similar fashion by receiving video data two pixels at a time from the memory array on pins DIN00–09 and DIN10–19 and outputting the pixels one at a time on pins PIXO0–9, output sub-arrays being preceded by a pulse on pin WSO and lines within those sub-arrays being proceeded by a pulse on pin LSO.

Along the bottom left-hand side of the chip symbol for the memory controller chip, designated with the initial suffixes "0" and "1", appear two sets of memory interface pins, one for each of the two memory buffer arrays, for interfacing the memory controller chip to the memory buffer. As explained in relation to the previous FIG. 5, each of the arrays is provided with a single RAS signal, four independent column address strobe signals CSB, and a 9-bit address signal RAB sufficient to address a 256K DRAM. If SRAM is used instead, two 9-bit registers must be provided in order to achieve multiplexing of the address bus. In each group of pins corresponding to one of the two memory arrays, two alternative write signals are provided, DWR for DRAM and SWR for SRAM.

Proceeding toward the bottom right-hand side of the chip symbol, 11 address pins CAD0–10 are provided for addressing one of the two 1K command buffers. Immediately opposite on the top-side of the chip symbol are provided 10 command pins COM0–9 for receiving a 10-bit command from the command buffer.

Proceeding counter-clockwise around the periphery of the chip symbol, the remainder of the pins will now be described. As mentioned previously, the memory controller chip is of bit-sliced architecture such that pixels with more than 10 bits may be supported by placing plural chips in parallel. For this purpose, a group of three input signals and a group of three output signals are provided, including two command read strobe signals indicating when window commands are valid and an output processing signal indicating when to start sending out data. The input signals, PRCOS, RCIS, and RCOS and the output signals PRCOM, RCOM, and RCIM are located opposite one another on the top and bottom right-hand sides of the chip symbol. Also located on the top right-hand side of the chip signal is a MASTR signal which tells the memory controller chip whether to use its own signals or another master's signals.

Further toward the right-hand side of the chip symbol, also opposing one another along the top and bottom sides, is a group of five test pins, the three input test pins RESB, SCEN, and SCIN being located along the top-side of the chip symbol and the two output test pins PTEST and SCOUT being located along the bottom-side of the chip symbol as was also the case with the bit-slice inputs and outputs. Activation of the scan enable pin SCEN causes the flip-flops in the memory controller chip to be connected in a continuous serial path. Data is clocked out of the serial scan output SCOUT as data is clocked into the serial test input SCIN. When scan control is active, identical clock signals must drive the input and output circuits. The parametric test output PTEST is connected to the output of a NAND gate string in which each NAND gate has its inputs connected to one other NAND gate and one chip input. To perform sensitivity checking of the chip inputs to TTL signal levels, a parametric tester changes the state of any one input and observes the parametric output change state. Activation of a master reset pin RESB sets the state of the chip to a known value. Completing the description of the pins along the bottom side of the chip symbol, the ACTIV pin indicates when pixels or commands are being processed and must be inactive in order to switch the roles of the memory arrays. The pin OFRI carries an output frame indicator signal indicating which of the memory arrays is the current output frame.

Skipping to the top middle of the chip symbol, activation of the ENBS pin causes the designation of an active one of the dual command buffers to be switched. All commands in the current command buffer must have been processed. The tri-state output enable pin TSOE allows for the column address strobe and data signals to the memory to be placed in a high impedance state so that they may be driven by another device. The data output enable pin DOE operates to start and stop the output windowing processing on a window-by-window basis once processing of the current output window is concluded. Activation of the OFRZ pin freezes the output frame by prohibiting switching of the frames such that the current output frame cannot be written over. The input and output clock pins CKI and CKO allow the input and output windowing processes to be driven in independent clock rates as previously described.

Completing the description of the inputs of the memory controller chip, the FLDM or field mode pin identifies the input sub-array as being of either the interlaced or non-interlaced video type so that the memory controller chip may de-interlace the input sub-arrays if necessary. Finally, the switch frame pin SWFRM causes the role of the memory arrays to be switched.

Figure 7A:
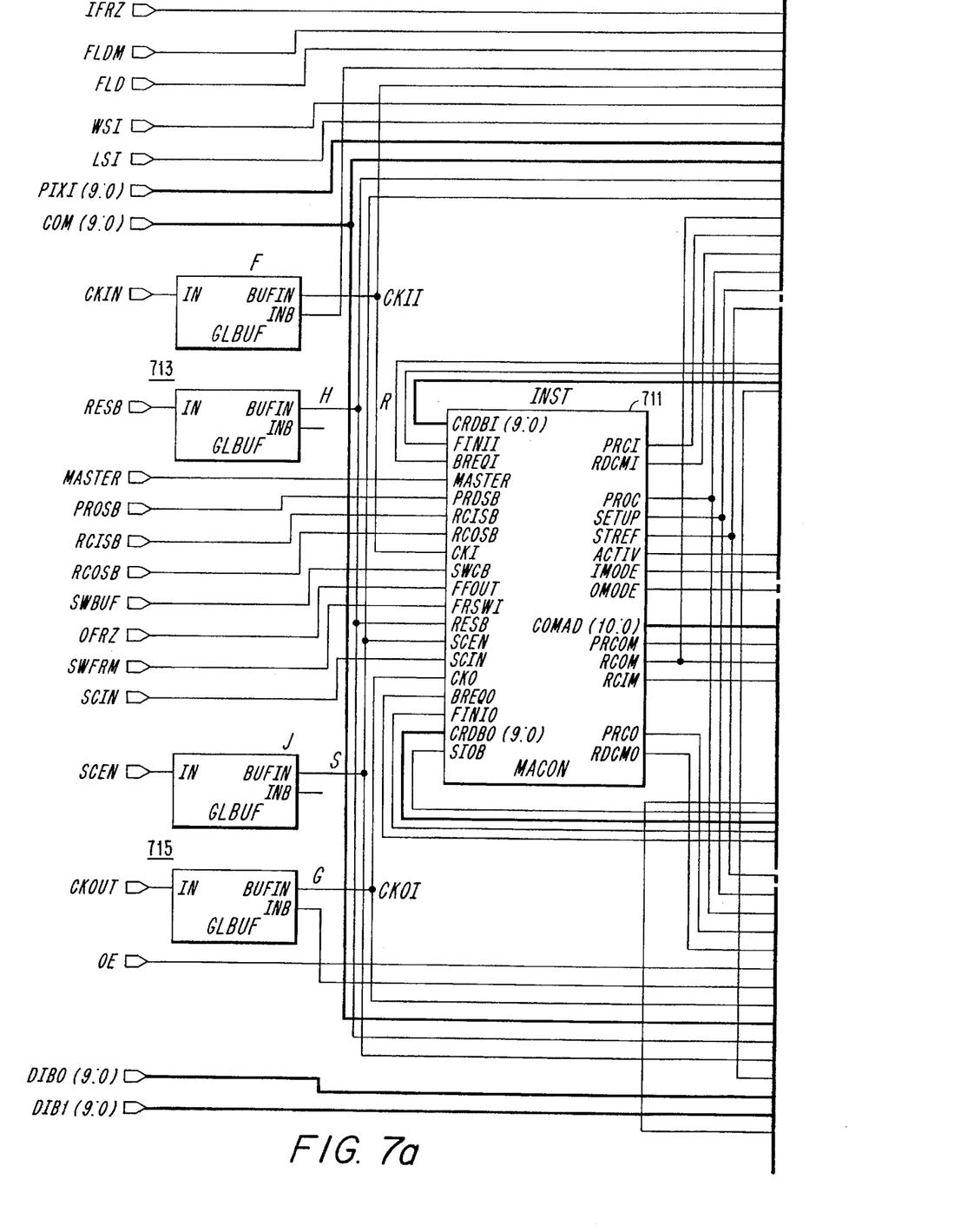
FIGS. 7a and 7b, is an internal block diagram of the memory controller chip.
Figure 7B:
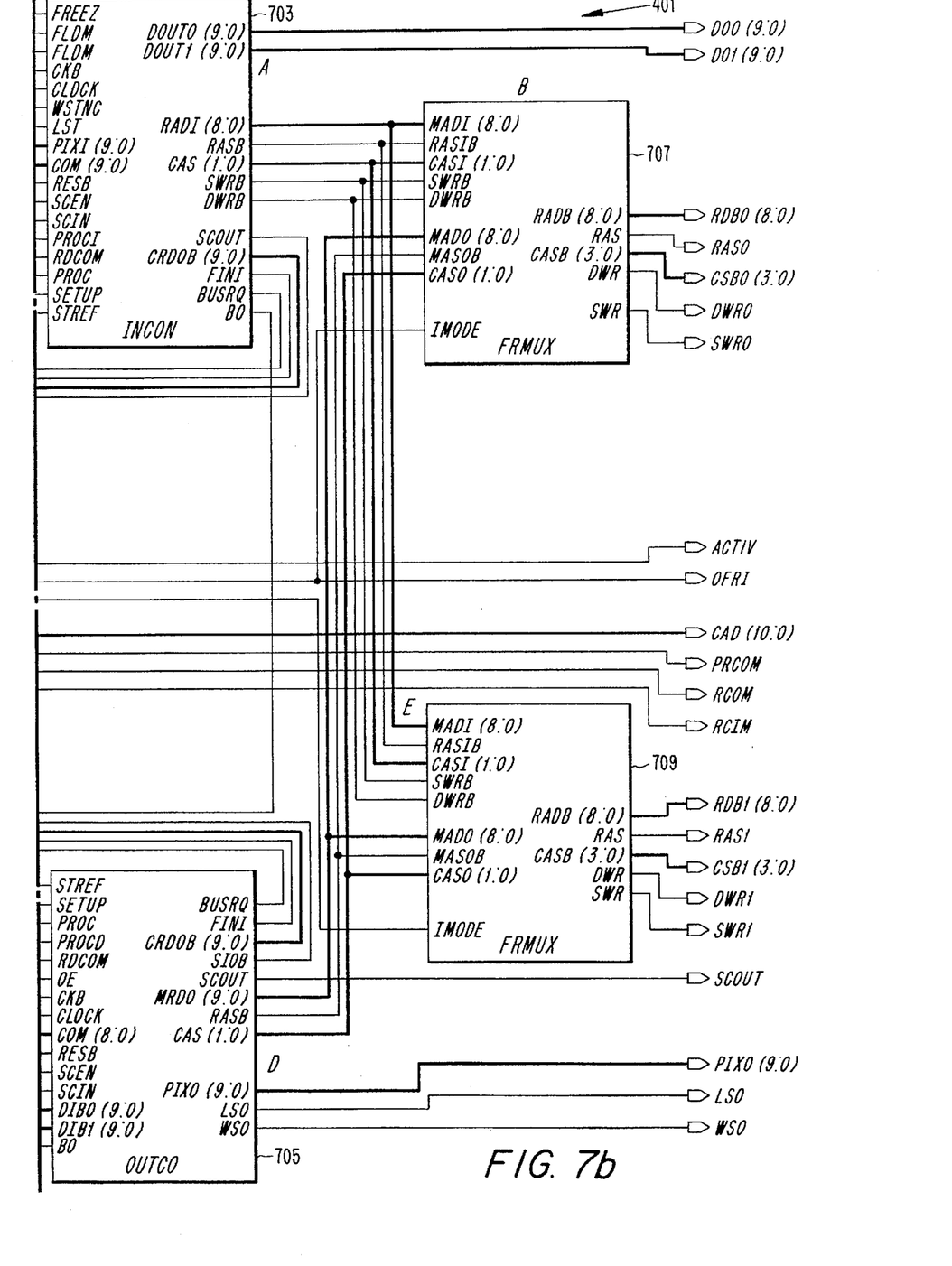

The function of the foregoing specified signals in the operation of the memory controller chip may be better understood with reference to FIG. 7, showing an internal block diagram of the memory controller chip 401. The signals fall into four groups including a data path group, a test group, a command group, and a module control group. An input window controller INCON 703 and an output window controller OUTCO (705) are each comprised of gates interconnected so as to realize the input window controller 411 and the output window controller 413 previously described in relation to FIG. 5. The input controller INCON and the output controller OUTCO are primarily concerned with signals in the data path group including the input and output pixel data PIXI and PIXO, the input and output frame and line synchronization signals WSI, LSI and WSO, LSO, the field number FLD, the input and output data from the DRAMs DIB0, DIB1 and DO0, DO1. Also included in the data path group are the DRAM control signals output by frame muxes FRMUX (707,709) comprising gates interconnected so as to realize the DRAM control muxes illustrated in FIG. 5. Together, the input and output controllers and the frame muxes require about 5500 gates.

The next largest signal group is the command group including the 11-bit command address output CAD, the command buffer switch enable signal SWBUF and the 10-bit command input COM for a total of 22 pins. The command COM is input to both the input controller INCON and the output controller OUTCO. The command address is output by the master controller MACON (711). The remaining two signal groups, namely the module control group and the test group, mainly involve the master controller MACON.

The module control group consists of the input and output clocks CKIN and CKOUT, the frame/field mode indicator FLDM, the input refresh and output freeze frame inputs REFI and OFRZ, the data output enable input DOE, the frame switch input SWFRM, and output frame indicator OFRI, the tri-state output enable TSOE, the enable buffer switch ENBS, and the bit-slice I/O pins MASTER, PROSB, RCISB, RCOSB, PRCOM, RCOM, and RCIM. Since the input and output clocks must be provided to both the respective window controller and the master controller, these signals are buffered in "global buffers" GLBUF (713, 715).

Also buffered are the master reset signal RESB and the scan enable signal SCEN, both part of the test group. The test group also includes the scan input SCIN, the scan output SCOUT, and the parametric test output PTEST. The master controller requires approximately 250 gates and approximately 300 additional gates are required for I/O signals and the parametric test function. The total number of required gates is therefore approximately 6050.

In addition to the chip-level inputs and outputs just described, a number of additional signals are exchanged between the input, output, and master controllers internal to the chip itself. A number of dual signals are exchanged separately between the master controller and each of the input and output controllers including command address signals (inverted) CADBI and CADBO, finish signals FINII and FINIO, bus request signals BREQI and BREQO, process start signals PRCI and PRCO, and read command signals RDCMI and RDCMO. The latter two pairs of signals are output from the master controller to the input and output controllers, whereas the other signals flow in the opposite direction from the input and output controllers back to the master controller. In addition, three signals are provided in common from the master controller to both the input and output controllers including a process ready signal PROC, a process set-up signal SETUP and a stop refresh signal STREF.

In operation, the CADBI and CADBO buses provide command addresses from the input and output controllers to the master controller from address generators internal to the input and output controllers. When one of the controllers is ready for a new command, it asserts its bus request signal BREQ requesting use of the multiplexed command bus. The input controller is given priority use of the command bus to avoid falling behind in the processing of the input data stream. The master controller then places the selected command address on the multiplexed command address bus and when the data from the command buffer becomes valid issues the read command RDCM to the appropriate command controller, causing it to register the command. When the controller receives a blank command, signalling completion of all of the window commands in the command buffer, the controller issues the finish signal FINI to the master controller. Only after both finish signals have been received is switching of the command buffer allowed. When the input and output frames are to be switched, the master controller issues the stop refresh signal STREF to both the input and output controllers, signalling them to stop background refresh processing so that window processing may begin anew. Preparatory to another round of window processing, the SETUP signal is issued to both the input and output controllers, followed shortly thereafter by the process ready signal PROC. Input processing is then begun by issuing the PRCI signal and output processing is begun by issuing the PRCO signal shortly thereafter.

In addition to the foregoing internal signals, a signal S10B is output from the output controller to the master controller indicating that the output controller is currently processing a command, and is used to generate the ACTIV output. A signal B8 is output from the input controller to the output controller and functions as a refresh timeout indicator. In order to avoid duplication, a refresh timer located in the input controller serves both the input and output controllers by way of the signal B8.

It will be appreciated from the foregoing that the memory controller chip of the present invention realizes in economical fashion a very powerful interface tool for a variety of data processing applications. Parallel processing of input and output windows maximizes throughput while the command structure of the memory controller chip preserves the greatest flexibility. Provisions are also made to ensure compatibility with a wide range of available memories.

One of ordinary skill in the art will appreciate that the present invention can be embodied in other specific forms without departing from the spirit or essential character thereof. The presently disclosed embodiments are therefore considered in all respects to be illustrative and not restrictive. The scope of the invention is indicated by the appended claims rather than the foregoing description, and all changes which come within the meaning and range of equivalents thereof are intended to be embraced therein.

What is claimed is:

1. Memory controller means for controlling a memory that comprises a plurality of individually addressable memory cells, the memory controller means comprising:

input data path means for receiving input data;

first means for generating signals to put said input data into at least one logical input array of memory cells of said memory, the logical input array having at least two variable input array dimensions;

second means for generating signals to extract from said memory the contents of at least one logical output array of memory cells, the logical output array having at least two variable output array dimensions that are independent of the variable input array dimensions;

output data path means for outputting as output data said contents; and command store means for storing a plurality of input array commands and a plurality of output array commands, each of the input and output array commands defining, respectively, the input and output array dimensions of said respective logical input and output arrays of memory cells.

2. The memory controller means of claim 1 wherein said first means for generating signals and said second means for generating signals are active for accessing said memory simultaneously.

3. The memory controller means of claim 2 wherein said first means generates signals to put said input data into a variable plurality of said logical input arrays of memory cells in said memory.

4. The memory controller means of claim 3 wherein said second means generates signals to extract from said memory the contents of a variable plurality of said logical output arrays of memory cells.

5. The memory controller means of claim 4 further comprising switch means for effectively reversing the roles of said input and output arrays by interchanging the signals generated by said first and second means.

6. The memory controller means of claim 4 further comprising a first clock input means for clocking said input data and a second clock input means independent of said first clock input means, for clocking said output data.

7. The memory controller means of claim 4 wherein said input data path means comprises demultiplexing means for decreasing the data rate while increasing the data width of said input data and wherein said output data path means comprises multiplexing means for increasing the data rate while decreasing the data width of said output data.

8. The memory controller means of claim 4 wherein said first and second means for generating signals each is capable of generating control signals for both a type of memory requiring data refresh and a type of memory not requiring data refresh, according to the type of said memory being controlled.

9. The memory controller means of claim 4 wherein said first and second means for generating signals each is programmable in order to generate control signals for a type of memory requiring data refresh according to a variable refresh rate.

10. The memory controller means of claim 4 wherein said first means is capable of generating signals to put interlaced image input data into a variable plurality of said logical input arrays of memory cells in non-interlaced format.

11. The memory controller means of claim 4 wherein said second means is programmable to extract the contents of a succeeding logical output array of memory cells a programmed time after extracting the contents of a preceding logical output array of memory cells, and to extract a succeeding row of each of said logical output arrays of memory cells a programmed time after extracting a preceding row thereof.

12. The memory controller means of claim 4 wherein said first means and said second means each comprises:

command control means for generating addresses for said command store means and for registering commands received from said command store means; and memory address generator means, responsive to said command control means, for generating addresses for said memory to put said input data into said logical input arrays of memory cells and to extract said contents of said logical output arrays of memory cells of said memory.

13. The memory controller means of claim 12 wherein said first means and said second means each further comprises memory control signal generator means responsive to said memory address generator means for generating control signals for said memory.

14. The memory controller means of claim 13 wherein said first means and said second means each further comprises:

refresh control means, cooperatively interfaced with said memory address generator means, for performing data refresh of said memory, and selector means, responsive to said memory address generator means, said refresh control means, and said memory control signal generator means, for selecting an address supplied by one of said memory address generator means and said refresh control means for application to said memory.

15. The memory controller means of claim 14 wherein said selector means comprises dual selectors each responsive to outputs of said memory address generator means and said memory control signal generator means of said first means and said memory address generator means and said memory control signal generator means of said second means, to apply the outputs of said memory address generator means and said memory control signal generator means of one of said first and second means to a respective one of said arrays of said memory.

16. The memory controller means of claim 15 further comprising chip control means, cooperatively interfaced with said command control means of said first means and said command control means of said second means, for outputting command addresses to said command store.

17. The memory controller means of claim 12 wherein said command store is double buffered such that one portion of said command store is capable of having commands stored therein at the same time as another portion of said command store is supplying commands to said command control means.

18. The memory controller means of claim 4, fabricated in the form of a monolithic integrated circuit.

19. The memory controller means of claim 18, bit-slice architectured such that a master memory controller means is capable of controlling one or more slave memory controller means.

20. The memory controller means of claim 19, wherein the size of the bit-slice is 10 bits.

21. Memory controller means for controlling a double-buffered memory that comprises a plurality of individually addressable memory cells, the memory controller means comprising:

input data path means for receiving input data;

first means for generating first signals to put said input data into at least one logical input array of memory cells of said memory, the logical input array having at least two variable input array dimensions;

second means for generating second signals to extract from said memory the contents of at least one logical output array of memory cells simultaneously as said first means generates said first signals, the logical output array having at least two variable output array dimensions that are independent of the variable input array dimensions; and output data path means for outputting said contents.

22. A data transformer, comprising:

a double-buffered memory comprising a plurality of individually addressable memory cells;

means for inputting data into one or more input sub-arrays of memory cells of said memory, the input sub-arrays having at least two variable input sub-array dimensions; and means for simultaneously extracting data from one or more output sub-arrays of memory cells of said memory different from said input sub-arrays, the output sub-arrays having at least two variable output sub-array dimensions that are independent of the variable input sub-array dimensions.

23. A general-purpose frame interface node, comprising:

a double-buffered frame memory;

means for inputting image data as one or more frames or sub-frames of at least two freely-selectable input dimensions into said memory according to commands contained in a rewritable command store; and means for simultaneously extracting one or more frames or sub-frames of at least two freely-selectable output dimensions from said memory according to commands contained in said rewritable command store.

24. A method of controlling a memory that comprises a plurality of individually addressable memory cells, the method comprising the steps of:

receiving input data;

generating signals to put said input data into at least one logical input array of memory cells of said memory, the logical input array having at least two variable input array dimensions;

generating signals to extract from said memory the contents of at least one logical output array of memory cells, the logical output array having at least two variable output array dimensions that are independent of the variable input array dimensions;

outputting said contents as output data; and generating addresses to retrieve a plurality of input array commands and a plurality of output array commands from command store means, and generating signals for registering said input and output array commands received from said command store means, each of said input and output array commands defining, respectively, the input and output array dimensions of said respective logical input and output arrays of memory cells.

25. A method of controlling a double-buffered memory that comprises a plurality of individually addressable memory cells, comprising the steps of:

receiving input data;

generating first signals to put said input data into at least one logical input array of memory cells of said memory, the logical input array having at least two variable input array dimensions;

generating second signals to extract from said memory the contents of at least one logical output array of memory cells simultaneously as said first means generates said first signals, the logical output array having at least two variable output array dimensions that are independent of the variable input array dimensions; and outputting said contents.

* * * * *